US007156291B2

(12) United States Patent
Ikeda

(10) Patent No.: US 7,156,291 B2
(45) Date of Patent: Jan. 2, 2007

(54) RECORDING MEDIA DISCARD DEVICE, RECORDING MEDIA DISCARD SYSTEM, AND CONTENTS ADMINISTRATION METHOD

(75) Inventor: Sotomitsu Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 10/795,316

(22) Filed: Mar. 9, 2004

(65) Prior Publication Data

US 2004/0188512 A1 Sep. 30, 2004

(30) Foreign Application Priority Data

Mar. 28, 2003 (JP) ............................ 2003-092092

(51) Int. Cl.
*G06F 17/00* (2006.01)

(52) U.S. Cl. ....................... 235/375; 235/451; 235/435

(58) Field of Classification Search ................ 235/375, 235/451, 435
See application file for complete search history.

(56) References Cited

U.S. PATENT DOCUMENTS

| | | | | |
|---|---|---|---|---|
| 6,193,163 | B1 * | 2/2001 | Fehrman et al. | 235/488 |
| 6,536,671 | B1 | 3/2003 | Baentsch | 235/487 |
| 2002/0017558 | A1 | 2/2002 | Graves | 235/380 |
| 2002/0052872 | A1 | 5/2002 | Yada | 707/6 |
| 2003/0034391 | A1 | 2/2003 | Wagner et al. | 235/385 |
| 2003/0164974 | A1 * | 9/2003 | Yoda | 358/1.15 |
| 2004/0069883 | A1 * | 4/2004 | Watanabe et al. | 241/236 |
| 2004/0100363 | A1 * | 5/2004 | Lane et al. | 340/5.86 |
| 2004/0118931 | A1 * | 6/2004 | Selinfreund et al. | 235/492 |
| 2005/0133707 | A1 * | 6/2005 | Ichiyanagi | 250/234 |

FOREIGN PATENT DOCUMENTS

| | | | |
|---|---|---|---|
| JP | 11-78176 | A | 3/1999 |
| JP | 11-110356 | A | 4/1999 |
| JP | 2000-285203 | A | 10/2000 |
| JP | 2002-120475 | | 4/2002 |
| JP | 2002-120475 | A | 4/2002 |

OTHER PUBLICATIONS

Patent Abstracts of Japan, vol. 2000, No. 13, Feb. 5, 2001 (JP 2000-285203 A, published Oct. 13, 2000).

Patent Abstracts of Japan, vol. 2002, No. 8, Aug. 5, 2002 (JP 2002-120475 A, published Apr. 23, 2002).

* cited by examiner

*Primary Examiner*—Steven S. Paik
(74) *Attorney, Agent, or Firm*—Fitzpatrick, Cella, Harper & Scinto

(57) ABSTRACT

The present invention provides a system which includes: a display media discard device which has a discard unit for discarding a display medium with an RF-ID tag and an RF-ID read unit for reading identification information of the RF-ID tag by radio communication; and a data administration device which stores contents information and administration information related to the contents information in association with the identification information of the RF-ID tag. In the system, when the display medium is discarded in the display media discard device, the contents information stored in the data administration device is deleted or the administration information is rewritten.

13 Claims, 4 Drawing Sheets

RECORDING MEDIA DISCARD DEVICE, RECORDING MEDIA DISCARD SYSTEM, AND CONTENTS ADMINISTRATION METHOD

BACKGROUND OF THE INVENTION

1. Field of the Invention

The present invention relates to a recording media discard device for discarding a recording medium and a system including the device, and a contents administration method.

2. Related Background Art

In a conventional printing system, for example, print data generated by a personal computer or the like is sent to a printer, whereby given contents can be printed. Such print system is capable of sharing electronic information contents through network connection.

However, when contents are once printed on paper used as a display medium, it is difficult to share or administer paper information because the paper information is separated from the network.

In addition, concerning conversion of paper information into an electronic form, Japanese Patent Application Laid-Open No. 2000-285203 discloses an information transmission method using paper incorporating an IC chip. This method also stores information, which is printed on paper, in the IC chip attached to the paper. Then, in the case in which the same information is printed on different paper, the information stored in the IC chip is read out and printed, whereby the information is distributed, exchanged, and saved using the paper as an electronic storage medium.

Further, as a printed matter publication control system, Japanese Patent Application Laid-Open No. H11-78176 discloses a technique concerning a system for preventing publication of an illegitimate printed matter. This system is used for, for example, publication control for printed matters such as securities and copyrighted articles. With this system, only in the case in which identification information on a display medium is recognized as legitimate identification information, contents stored in a contents controlling apparatus are printed on the display medium. Thus, prints having the legitimate identification information can be administered. Here, as "identification information", for example, print information such as characters and signs, magnetic information, optical detection information such as a barcode, a watermark, and the like are disclosed.

Moreover, Japanese Patent Application Laid-Open No. 2002-120475 discloses, as a document management system, a technique which allows easy grasp of a person in charge, a place of approval, and the like together with search, consultation via circular, circulation, and the like of a document by using a document including a sheet attached with an identifier. The laid-open patent application also indicates that contents, which are printed on the sheet attached with an identifier, and the identifier of the sheet, on which the contents are printed, are administered in association with each other, and discloses a shredder incorporated with a reading device as an office machine for discarding the sheet attached with the identifier which is used as a display medium.

In a general conventional use/administration system for paper documents, paper used as a display medium, on which contents are printed or copied, is separated from a network system. Thus, it is practically impossible to administer prints.

In addition, Japanese Patent Application Laid-Open No. 2000-285203 described above simply discloses a technique for storing contents in an IC chip and a technique for reading out and printing the contents stored in the IC chip but does not disclose a description concerning administration in the case where the paper with an IC chip is discarded.

Further, Japanese Patent Application Laid-Open No. H11-78176 described above discloses a system for administering contents printed on a display medium but does not disclose a description concerning administration in the case where the display medium is discarded.

Moreover, in the document management system disclosed in Japanese Patent Application Laid-Open No. 2002-120475, when the sheet attached with an identifier is discarded by a shredder, the shredder reads the identifier, whereby it can be confirmed that the sheet with the identifier has been discarded. However, in Japanese Patent Application Laid-Open No. 2002-120475, even if a sheet is discarded, contents printed on the discarded sheet remains in a management device.

In addition, this system is a system for administering existence and discard of a sheet and cannot prevent a user from discarding an important document by mistake.

SUMMARY OF THE INVENTION

It is an object of the present invention to solve the problems of the conventional techniques described above.

It is another object of the present invention to perform administration of contents itself printed on a recording medium such as a sheet on the basis of discard of the recording medium.

It is a still another object of the present invention to prevent contents from being discarded by mistake.

Other objects of the present invention will be apparent from the following descriptions and the drawings.

DETAILED DESCRIPTION OF THE PREFERRED EMBODIMENTS

Embodiments of the present invention will be hereinafter described with reference to the accompanying drawings.

First Embodiment

First, a first embodiment of the present invention will be described with reference to FIGS. 1 and 2.

Figure 1:
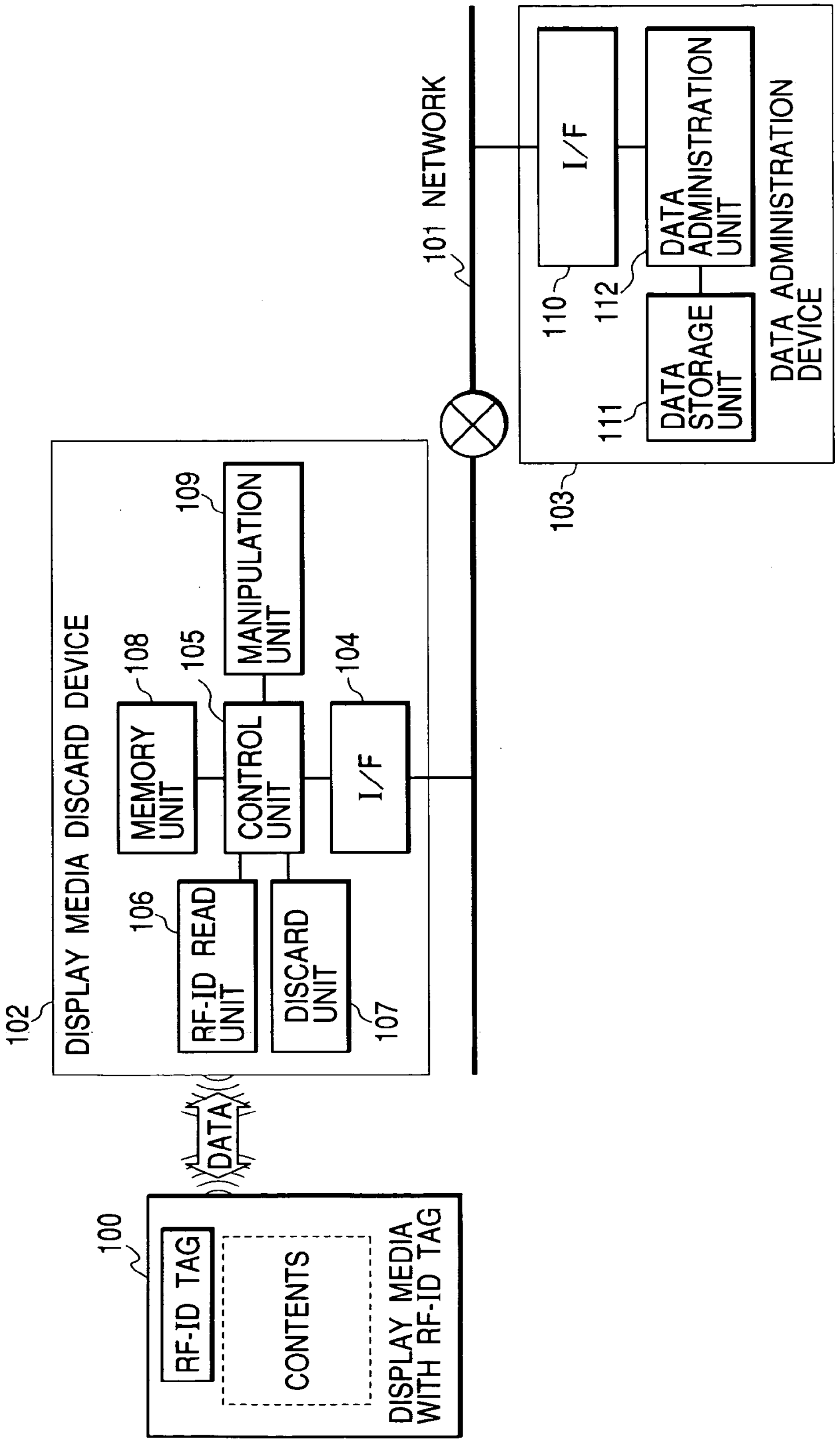
FIG. 1 is a block diagram showing a structure of a contents sharing system which uses a display medium with an RF-ID tag in accordance with a first embodiment of the present invention.

FIG. 1 is a block diagram showing a structure of a contents sharing system using a display medium with an RF-ID tag in accordance with the first embodiment of the present invention. In the figure, reference numeral 100 denotes a display medium with an RF-ID tag; 101, a network; 102, a display media discard device (a display media discard device including in an RF-ID reader); and 103, a data administration device. The display media discard device 102 and the data administration device 103 are connected to the network 101.

Here, the display medium with an RF-ID tag 100 is a display medium in which an RF-ID tag, which is capable of communicating identification information (e.g., an ID number) incorporated in an IC chip to an RF-ID read unit 106 serving as an RF-ID reader according to a radio system, is fixed to a front surface or a rear surface of a display medium by adhesion or the like so as not to come off, inserted in the display medium, or formed so as to be sandwiched by two or more display media. In addition, the display medium may be any printable sheet-like display medium such as general plain paper, paper with a coated surface, photographic paper such as a photograph, thermal paper, diazo sensitized paper, a PET film for an overhead projector, or a resin film of polyethylene, plastics, or the like.

The display media discard device 102 includes a network interface (I/F) 104, a control unit 105, an RF-ID read unit 106, a display medium discard unit 107, a memory unit 108, and a manipulation unit 109. The data administration device 103 includes a network interface (I/F) 110, a data storage unit 111, and a data administration unit 112.

The display medium with RF-ID tag 100 and the display media discard device 102 perform data communication by radio between the RF-ID read unit 106 and the RF-ID tag.

The network interface 104 is an interface for performing data communication via a communication line. An IP address is allocated to the display media discard device 102, and is identified on the network 101. The control unit 105 controls reading of an IF-ID, printing, data communication, data display, data storage, and the like and performs overall function control of the display media discard device 102. The RF-ID read unit 106 is a unit for reading identification information of the RF-ID tag, which is attached to the display medium with an RF-ID tag 100, according to a radio system. The RF-ID read unit 106 includes a processor unit for performing control and data processing, an RF unit for performing modulation of transmission data and coding of reception data, and an antenna unit for performing RF communication with the RF-ID tag.

Any system, which discards the display medium with an RF-ID tag 100 such that contents on the medium cannot be recognized, such as cutting or melting for making the contents unreadable is applicable to the display media discard unit 102. The display media discard unit 102 may have a function for discarding the display medium with an RF-ID tag 100 after the RF-ID tag is separated.

The memory unit 108 is used for temporarily storing upon confirmation of information, identification information, contents information concerning the identification information, administration information related to the contents information, and the like to realize a high degree of security.

The manipulation unit 109 is a human interface for performing print instruction and has a display portion and an input portion. Specifically, the display portion may be a display which can display at least information related to contents or a display with a touch panel having a digitizer, with which input can be performed, formed on a surface thereof. Alternatively, the display portion may show a processing state with simple lighting display of a light-emitting diode (LED). In this display portion, contents information related to identification information, administration information related to the contents information, and the like are displayed. Confirmation information on discard of a display medium is also displayed. In addition, the input portion may be a manipulation button, voice input, or the like instead of the touch panel. Further, it is also possible that, as the display medium with an RF-ID tag 100 is placed in a predetermined position of the display media discard device 102, the display media discard device 102 automatically recognizes the display medium with an RF-ID tag 100 to issue a discard order for the display medium with an RF-ID tag 100. It is also possible that, even in the case in which the RF-ID read unit 106 has detected an RF-ID of the display medium with an RF-ID tag 100, the display media discard device 102 automatically recognizes the display medium with an RF-ID tag 100 according to a detection signal of the RF-ID read unit 106 to instruct inquiry about contents.

The display media discard device 102 may include an optical reading function, a data storage unit, and a data administration unit in addition to the above-mentioned functions. In addition, the display media discard device 102 may be integrated with a computer or may incorporate a computer.

The data administration device includes the network interface (I/F) 110, the data storage unit 111, and hate data administration unit 112.

The network interface 110 is an interface for performing data communication via a communication line. An IP address is allocated to the data administration device 103, and is identified on the network 101.

The data storage unit 111 includes a database of identification information for RF-ID tags allowed to be used and a database including registered identification information, contents information related to the identification information, and administration information related to the contents information.

The database of identification information for RF-ID tags allowed to be used is registered and updated at any time via the network 101 at a point when the display medium with an RF-ID tag 100, which is usable in the system of the present invention, is put on the market. Consequently, it becomes possible-to use a display medium for which security is guaranteed, and security administration of a print of contents can be performed.

The registered identification information is an ID number of an RF-ID tag which is registered when contents are printed on the display medium with an RF-ID tag 100. The contents information related to identification information means information printed on the display medium with an RF-ID tag 100. The contents information sometimes means contents information which is not printed on the display medium with an RF-ID tag 100 but is stored in association with identification information of the display medium with an RF-ID tag 100. In other words, only on the display medium with an RF-ID tag 100, a part of contents information is printed and formed, and information related to the contents information is stored. It is possible to access and print this information when it is necessary. In addition, in the case in which the contents information has been changed, the contents information before the change and the contents information after the change may be stored in association with each other.

The administration information related to the contents information consists of at least information added to contents, information added to printing, related identification information, and security information. The information added to contents is information on a creator of contents, software used for creating the contents, date and time of the creation, a computer used for creating the contents, and the like. The information added to printing is information on date and time of printing, a printer used for the printing, a range of printing, print options, a model of the printer, a version of a printer driver, a print property, and the like. The related identification information is an ID number of an RF-ID tag which is attached to a display medium on which identical contents are printed, an ID number of an RF-ID tag attached to a display medium on which a corrected version of identical contents information is printed, and the like.

When a display medium is discarded by the display media discard device 102, if it is instructed to add administration information related to the contents information or to delete the contents information, the series of information is also deleted. The security information of the display medium with an RF-ID tag 100 is information on permission of access to contents, that is, information related to browsing, change, printing, and the like of the contents.

The data administration unit 112 performs data storage control processing such as new registration, addition registration, correction registration, deletion, and the like of data stored in the data storage unit 111, control of data communication via the network 101, update of the database of identification information for RF-ID tags allowed to be used, and the like.

Figure 2:
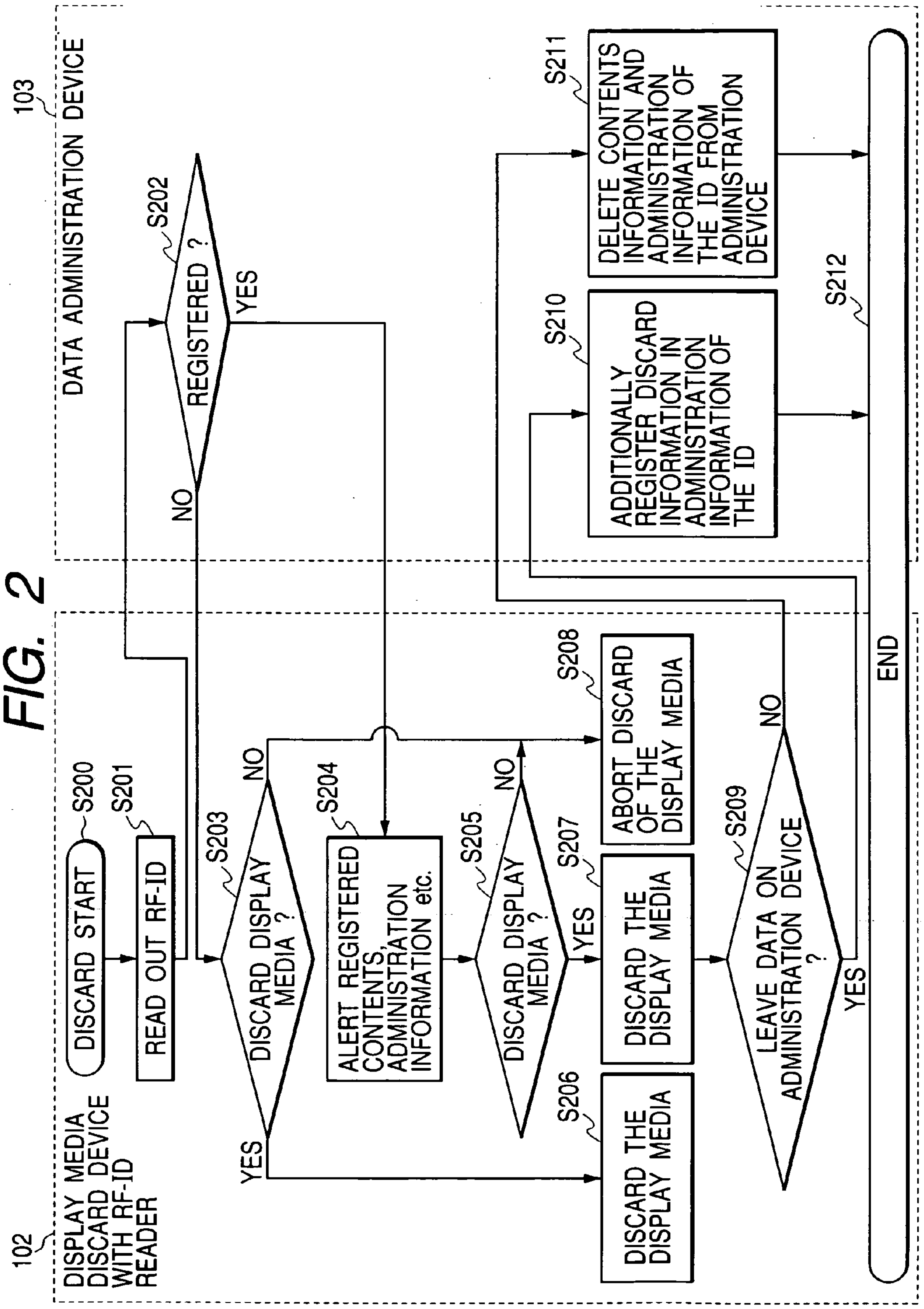
FIG. 2 is a flowchart of a discard process of a display media discard device in the contents sharing system which uses the display medium with an RF-ID tag in accordance with the first embodiment of the present invention.

FIG. 2 is a flowchart of a discard process in the respective units of the display media discard device 102 in the contents sharing system which uses the display medium with an RF-ID tag in accordance with this embodiment.

FIG. 2 will be hereinafter described.

First, the display medium with an RF-ID tag 100 is placed in a predetermined position of the display media discard device 102. The display media discard device 102 issues a discard command for a display medium from the manipulation unit 109 to start discard work (step S200). In the beginning, the display media discard device 102 reads out identification information of an RF-ID (step S201), and confirms whether or not the identification information is registered in the data administration device 103 of the present system (step S202). Then, if the identification information is not registered in the data administration device 103, the display media discard device 102 indicates its the display portion that the display medium is not registered. Then, the display media discard device 102 performs display for confirmation on whether or not discard of the display medium is executed, and a user chooses whether discard is to be executed or aborted (step S203). The display media discard device 102 processes the display medium according to a result of the choice (steps S206 and S208).

In addition, in the case in which the identification information is registered in the data administration device 103, the display media discard device 102 displays, for example, a part of administration information of contents related to the identification information on the display portion and alerts confirmation on whether or not discard of the display medium is executed (step, S204) The user chooses whether discard is executed or aborted (step S205), and the display media discard device 102 processes the display medium according to a result of the choice (steps S207 and S208).

In the case in which the display medium with an RF-ID tag 100 is discarded in this way, in the display media discard device 102, it is also possible to delete a group of data related to the identification information (which consists of, for example, ID numbers and contents information related to the ID numbers, and contents administration information) stored in the data administration device 103. Therefore, the display media discard device 102 displays an inquiry about whether or not data related to the contents information on the discarded display medium is to be left on the data administration device 103. On the basis of the contents on the display, the user can choose whether or not the data related to the contents information on the discarded display medium is to be left on the data administration device 103 (step S209). Then, if the data is to be left, in the data administration device 103, the display media discard device 102 additionally registers the fact of discard, date and time of discard, a name of the device, and other conditions in the administration information related to the identification information (step S210). In addition, in the case in which the data is to be deleted, the display media discard device 102 deletes the contents information related to the identification information, the administration information, and the like from the data administration device 103 (step S211). In addition, regardless of whether or not the data is deleted, the display media discard device 102 adds the fact that the display medium has been discarded in contents administration information of other identification information associated with the identification information.

After the above-mentioned steps are finished, the discard process of FIG. 2 ends (step S212).

The contents sharing system using the display medium with an RF-ID tag in accordance with this embodiment is appropriate for administration of a print document for an individual, administration of a print such as an important document with high confidentiality when the print is distributed to plural persons, and the like. In particular, the contents sharing system is suitable for administration of a confidential document in a company.

In addition, the contents sharing system using the display medium with an RF-ID tag in accordance with this embodiment is also effective for a purpose of preventing illegitimate printing, copying, falsification, and the like. The contents sharing system is suitable for administration of securities, official documents, contracts, applications, certificates, medical sheets, receipts, admission tickets, copyrighted articles (novels, paintings, posters, picture postcards), membership cards, electronic document output for a government, photographs, and the like.

In this embodiment, after a display medium is discarded, the display media discard device 102 confirms whether or not data on the display medium is to be left in the data administration device 103, and the data is processed in the data administration device 103. However, the discard process of the display medium and the deletion of the data from the data administration device 103 may be performed simultaneously or may be performed in the opposite order.

By using the display media discard device 102 in the contents sharing system using the display medium with an RF-ID tag in accordance with this embodiment, it has become possible to delete and administer both display medium (paper) information and digital information.

In short, in this embodiment, an RF-ID tag is attached to a display medium to associate identification information with contents printed on the display medium, and contents information corresponding to the identification information and administration information related to the contents information are administered in the data administration device 103 connected to the network 101. Consequently, the display medium is discarded in the display media discard device 102 connected to the network 101 to rewrite the administration information related to the contents information, whereby administration of the display medium has become possible. In addition, it has become possible to discard the contents using the display media discard device 102. As a result, sharing of contents has become possible under administration excellent in security.

Second Embodiment

Next, a second embodiment of the present invention will be described with reference to FIG. 3.

Figure 3:
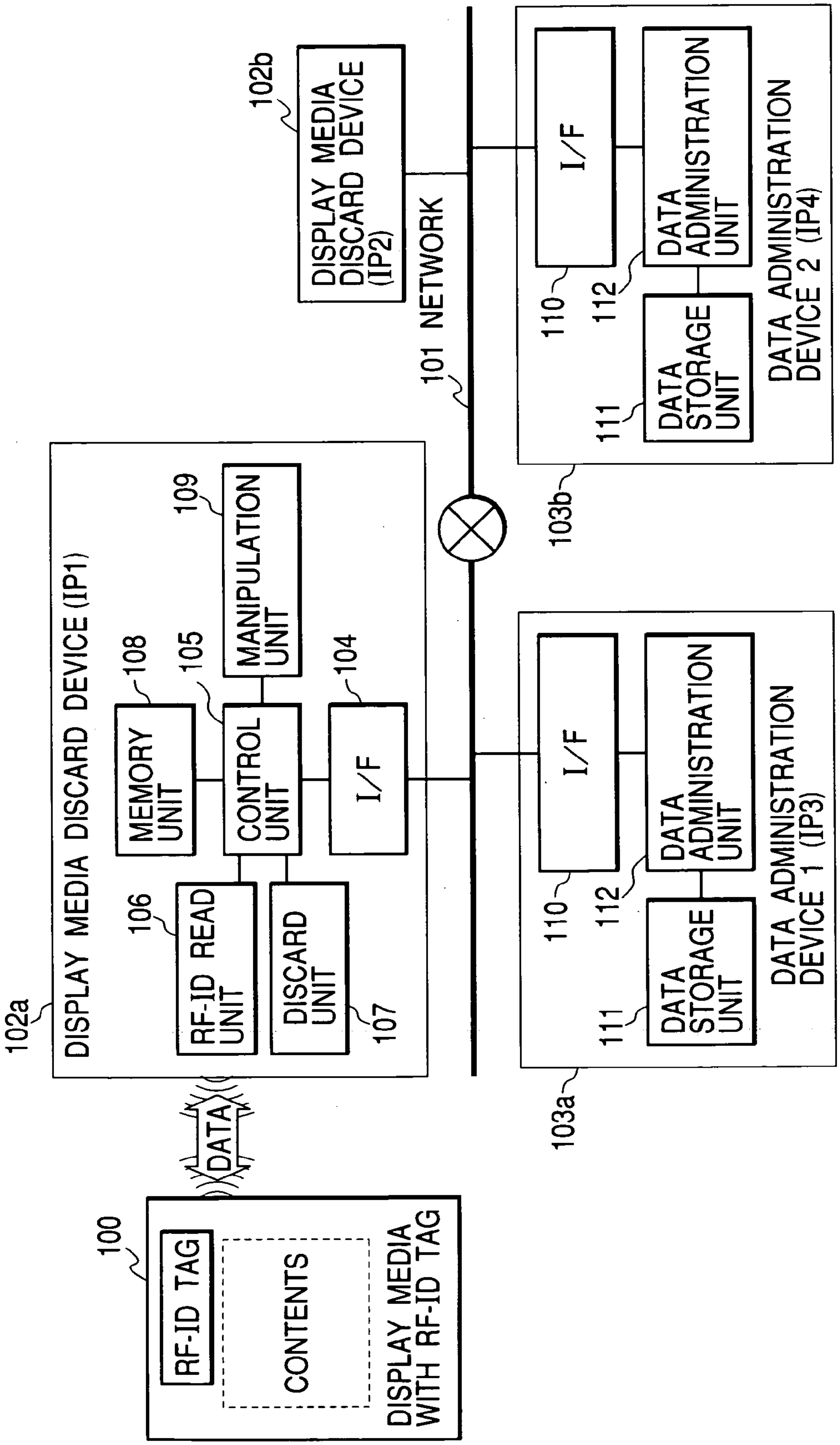
FIG. 3 is a block diagram showing a structure of a contents sharing system which uses a display medium with an RF-ID tag in accordance with a second embodiment of the present invention.

FIG. 3 is a block diagram showing a structure of a contents sharing system using a display medium with an RF-ID tag in accordance with the second embodiment of the present invention. In the figure, components identical with those in FIG. 1 of the first embodiment described above are denoted by the identical reference numerals and signs.

In this embodiment, plural display media discard devices (display media discard devices each including an RF-ID reader) 102*a* and 102*b* and plural data administration devices 103*a* and 103*b* are connected to the network 101. The devices are connected in IP addresses different from each other.

In FIG. 3, as a part of the devices, two display media discard devices and two data administration devices are illustrated.

Contents in accordance with this embodiment are stored on the data administration devices 103*a* and 103*b* as a data group consisting of ID information, contents information, and administration information related to the contents information.

In this embodiment, when this data group is stored in the data storage unit 111, information indicating on which IP address the data group is stored is added, and the data administration devices 103*a* and 103*b* sometimes share and update a data table consisting of ID numbers and IP addresses serving as identification information, whereby security is realized.

This function closely resembles a function carried out by a DNS server in the Internet. Although this function is performed by the data administration devices 103*a* and 103*b*, an administration device may be set separately according to a size of the network 101.

In this embodiment, the data group consisting of identification information, contents information, and administration information related to the contents information is usually stored on the basis of an order of the data administration devices 103*a* and 103*b*, which is entirely optimized, because of factors such as an organization form and an installation location.

In this embodiment, the display media discard devices 102*a* and 102*b*, which are connected to the network 101 and connected to every possible places, are used, whereby it has become possible to make use of the contents sharing system.

Third Embodiment

Next, a third embodiment of the present invention will be described with reference to FIG. 4.

Note that, since a basic structure of a contents sharing system in accordance with this embodiment is identical with that of the first embodiment described above, FIG. 1 is applied to the following description.

This embodiment is different from the first embodiment in that the display media discard device 102 is provided with a separation and recycle function for an RF-ID tag. The separation and recycle function for an RF-ID tag makes the display media discard device 102 effective in recycling. Note that since processing for changing or deleting information, which is administered by the data administration device 103, at the time of discard of a display medium is the same as the processing shown in FIG. 2, the processing won't be described here.

Figure 4:
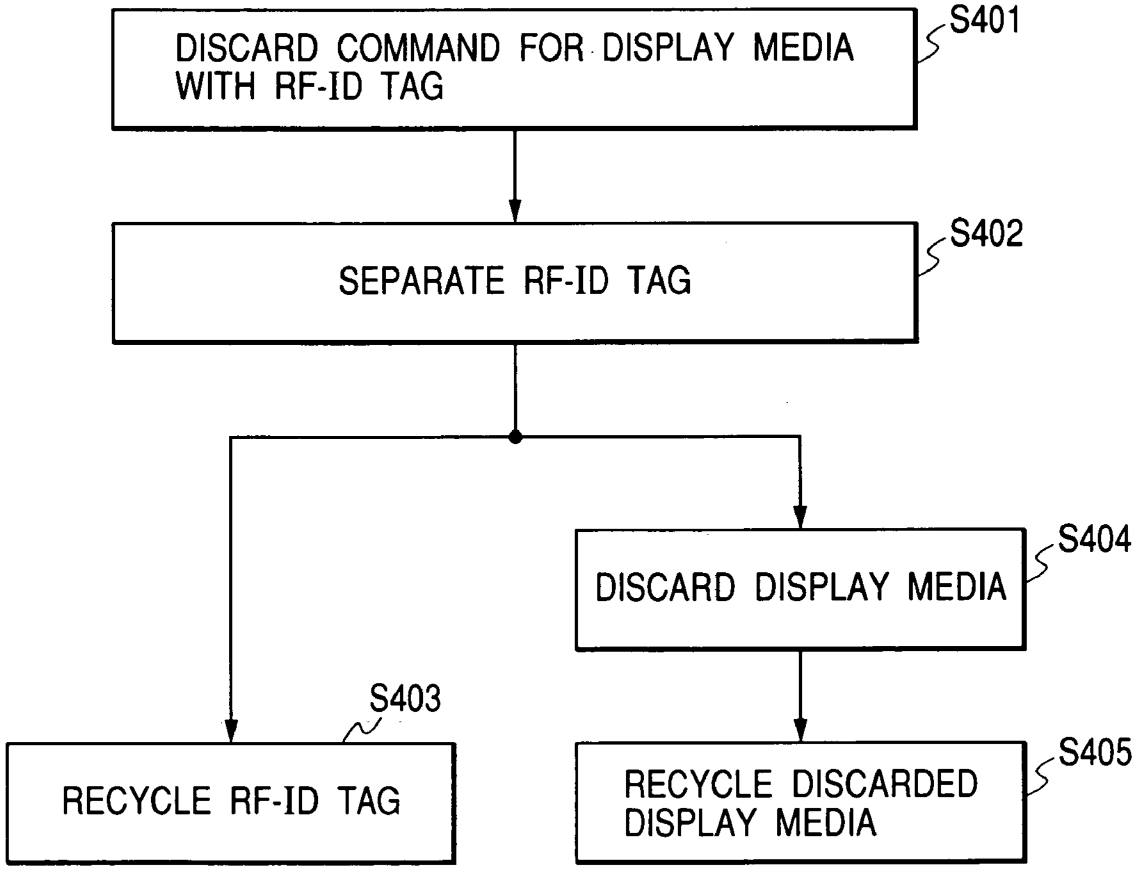
FIG. 4 is a flowchart of an RF-ID tag separation and discard process of a display media discard device in a contents sharing system which uses a display medium with an RF-ID tag in accordance with a third embodiment of the present invention.

FIG. 4 is a flowchart of a separation and discard process for an RF-ID tag of the display media discard device 102 in the contents sharing system in accordance with this embodiment.

When a discard command for the display medium with an RF-ID tag 100 is issued (step S401), first, the display media discard device 102 separates an RF-ID tag from the display medium with the RF-ID tag 100 (step S402) and recycles the RF-ID tag (step S403).

The RF-ID tag consists of an IC chip and an antenna. Since the RF-ID tag adheres to the display medium with an RF-ID tag 100, the RF-ID tag is separated from the display medium 100 by cutting an RF-ID tag portion from the display medium 100. The remaining display medium after the separation of the RF-ID tag portion is cut such that contents displayed thereon cannot be read and is then discarded (step S404). The discarded display medium is recycled (step S405). In addition, it is also possible to remove an IC chip portion from the recycled RF-ID tag by melting or the like and recycle the IC chip portion.

According to this embodiment, recycle of the display medium with an RF-ID tag can be facilitated.

The various examples and embodiments of the present invention have been described. However, those skilled in the art will understand that the spirit and scope of the present invention are not limited to the specific descriptions and drawings in this specification but can cover various alterations and modifications which are described in claims.

Examples of aspects of the present invention will be hereinafter described.

A first aspect of the present invention is a system including a display media discard device which has a function for discarding a display medium with an RF-ID tag and a function for reading identification information of the RF-ID tag by radio communication; and a data administration device which stores contents information and administration information related to the contents information in association with the identification information of the RF-ID tag, the system being characterized by including administration information rewriting means which, when the display medium is discarded in the display media discard device, rewrites administration information related to the contents information stored in the data administration device.

According to the first aspect, administration of the display medium can be performed.

A second aspect of the present invention is a system as described in the first aspect, characterized in that, when the display medium is discarded in the display media discard device, it is possible to discard the contents information stored in the data administration device.

According to the second aspect, since contents information stored in the data administration device can be discarded using the display media discard device, deletion processing of unnecessary data can be performed easily without requiring manipulation from a separate computer, server, or the like.

A third aspect of the present invention is a system as described in the first aspect, characterized in that plural data administration devices and plural display media discard devices are connected via a network, which allows all data groups consisting of the contents information stored in the respective data administration devices, administration information related to the contents information, and ID information of the RF-ID to be shared, and allows access to all the data groups in the respective display media discard devices.

According to the third aspect, even in the case in which a size of the system is increased and plural data administration devices and plural display media discard devices are connected on a network, the system of the present invention can be realized. More specifically, for example, the system can be realized by providing a function for sharing an IP address of the data administration device, which stores therein an ID number which is Id information and contents information of data with the ID number, and the like at any time like in the case of the Internet where IP addresses are shared in DNS servers. Alternatively, the system can be realized by separately providing a server such as a DNS server which administers an IP address of the data administration device which stores therein an Id number and contents information.

According to the third aspect, contents can be shared with a high degree of security in any places throughout the world connected via the Internet if the display media discard device of the present invention is connected.

A fourth aspect of the present invention is a display media discard device having a function for discarding a display medium with an RF-ID tag, characterized by including: identification information reading means for reading identification information of the RF-ID tag by with radio communication; display means for displaying administration information or the like related to contents information corresponding to the identification information read by the identification information reading means; and means for performing processing for discarding the display medium with the RF-ID tag, from which the identification information is read, and rewriting the administration information of the contents information related to the identification information in accordance with an instruction form a user.

According to the fourth aspect, when a user discards a display medium, since the user can confirm whether or not the display medium may be discarded, the display medium can be prevented from being discarded by mistake. In addition, since the display media discard device confirms that the display medium has been discarded and then sends discard information to the data administration device, it is possible to thoroughly perform administration related to the contents of the display medium.

A fifth aspect of the present invention is a display media discard device according to the fourth aspect, characterized by further including separation and recycling means which separates and recycles the RF-ID tag attached on the display medium in the display media discard device.

In particular, separation by type and recycle of paper used as a display medium will be a more important process in future. In a display medium with an RF-ID tag, it is necessary to remove the RF-ID tag when the display medium is separated by type and recycled. According to the fifth aspect, a position of the RF-ID tag in the display medium is determined in advance, whereby it becomes possible to remove that part of the RF-ID tag and recycle the other part of the display medium.

As described above, according to the present invention, information, which are administered in relation to the display medium can be changed and deleted on the basis of discard processing of the display medium and, for example, a discard history and the like of contents information printed on the display medium can be administered. Therefore, contents administration can be performed in an environment with a high degree of security. In addition, a print of the contents which requires a caution on security for the user can be administered easily and strictly.

Further, important contents can be prevented from being discarded by mistake using identification information of the display medium.

What is claimed is:

1. A recording media discard system comprising an administering apparatus and a discarding apparatus connected to the administering apparatus via a network, wherein the discarding apparatus comprises:

a detection device configured to detect identification information on a recording medium; and a discarding device configured to discard-the such a recording medium in accordance with a discard instruction; and wherein the administering apparatus comprises:

a storage device configured to store identification information for the recording medium and contents information of the recording medium in association with one another, the system further comprising:

an inquiry device to inquire of a user whether or not to eliminate from the storage device contents information administered by the administering apparatus and associated with the identification information detected by the detection device, in the event of an instruction to discard the recording medium; and an eliminating device configured to eliminate from the storage device contents information administered by the administering apparatus and associated with the identification information detected by the detection device, in accordance with a user's input in response to the inquiry from the inquiry device.

2. A recording media discard system according to claim 1, further comprising a changing device configured to change administration information administered by the administering apparatus without deleting the contents information based on a another input of the user in response to the inquiry from the inquiry device.

3. A recording media discard system according to claim 1, further comprising a recycling device configured to recycle an identification information transmission unit, attached to the recording medium, when the recording medium is discarded by the discarding device.

4. A recording media discard system according to claim 1, further comprising a determining device configured to determine whether or not the administering apparatus administers the contents information associated with the identification information detected by the detection device;

wherein the inquiry device is operable to execute the inquiry in accordance with the determination by the determining device.

5. A recording media discard system according to claim 1, wherein the detection device comprises an RF-ID read unit for reading an RF-ID tag carried by the recording medium.

6. A recording media system according to claim 1, further comprising an addition device configured to add information that the recording medium has been discarded to administration information of the identification information of another recording medium associated with the identification information of the discarded recording medium, regardless of whether or not the eliminating device eliminates the content information associated with the identification information of the recording medium by the discarding device.

7. A recording medium discard apparatus, for use in a system having administering apparatus for storing identification information and contents information of a recording medium in association with one another, the recording medium discard apparatus comprising:

a detection device configured to detect identification information on a recording medium;

a discard device configured to discard such a recording medium in accordance with a discard instruction;

an inquiry device configured to inquire of a user whether or not to eliminate from the administering apparatus contents information administered by the administering apparatus and associated with the identification information detected by the detection device, in the event of an instruction to discard the recording medium; and an eliminating device configured to eliminate from the administering apparatus contents information administered by the administering apparatus and associated with the identification information detected by the detection device, in accordance with user's input in response to the inquiry from the inquiry device.

8. A recording medium discard apparatus according to claim 7, further comprising a changing device configured to change administration information administered by the administering apparatus without deleting the contents information based on another input of the user in response to the inquiry from the inquiry device.

9. A recording medium discard apparatus according to claim 7, further comprising a recycling device configured to recycle an identification information transmission device attached to the recording medium when the recording medium is discarded by the discarding device.

10. A recording medium discard apparatus according to claim 7, wherein the inquiry device is operable to execute the inquiry in accordance with whether or not the administering apparatus administers the contents information associated with the identification information detected by the detection device.

11. A recording medium discard apparatus according to claim 7, wherein the detection device comprises an RF-ID read unit for reading an RD-ID tag carried by the recording medium.

12. A recording medium discard apparatus according to claim 7, further comprising:

an addition device configured to add information representing that the recording medium has been discarded, to administration information of the identification information of another recording medium associated with the identification information of the discarded recording medium, regardless of whether or not the eliminating device eliminates the content information associated with the identification information of the recording medium discarded by the discarding device.

13. A method of administering contents using a recording medium discard apparatus and an administering apparatus, the method comprising:

detecting identification information on a recording medium, using the discard apparatus, and discarding the recording medium in accordance with a discard instruction;

administering identification information of a recording medium and contents information associated with the recording medium using the administering apparatus;

inquiring of a user whether or not to eliminate from the administering apparatus contents information administered by the administering apparatus and associated with the identification information detected in the detection step, in the event of an instruction to destroy the recording medium; and eliminating from the administering apparatus the contents information administered by the administering apparatus and associated with the identification information detected by the detecting step, in accordance with a user's input in response to the inquiry.

* * * * *

UNITED STATES PATENT AND TRADEMARK OFFICE

CERTIFICATE OF CORRECTION

PATENT NO. : 7,156,291 B2
APPLICATION NO. : 10/795316
DATED : January 2, 2007
INVENTOR(S) : Sotomitsu Ikeda It is certified that error appears in the above-identified patent and that said Letters Patent is hereby corrected as shown below:

Title Page [56] REFERENCES CITED

Foreign Patent Documents:
"JP 2002-120475 4/2002" should be deleted.

COLUMN 4

Line 24, "hate" should read --the--.
Line 41, "possible-to" should read --possible to--.

COLUMN 5

Line 56, "(step, S204)" should read (step S204).--.

COLUMN 9

Line 22, "by with" should read --by--.
Line 31, "form" should read --from--.
Line 56, "are" should read --is--.

COLUMN 10

Line 8, "discard-the" should read --discard--.

UNITED STATES PATENT AND TRADEMARK OFFICE

CERTIFICATE OF CORRECTION

PATENT NO. : 7,156,291 B2 
APPLICATION NO. : 10/795316
DATED : January 2, 2007
INVENTOR(S) : Sotomitsu Ikeda It is certified that error appears in the above-identified patent and that said Letters Patent is hereby corrected as shown below:

COLUMN 11

Line 11, “with” should read --with a--.

Signed and Sealed this

Twelfth Day of June, 2007

JON W. DUDAS

*Director of the United States Patent and Trademark Office*